US006997851B2

(12) United States Patent
Höfler

(10) Patent No.: US 6,997,851 B2
(45) Date of Patent: Feb. 14, 2006

(54) METHOD FOR THE CONTROL OF A DRIVE TRAIN

(75) Inventor: Hans Höfler, Immenstaad (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/800,576

(22) Filed: Mar. 15, 2004

(65) Prior Publication Data
US 2004/0192495 A1 Sep. 30, 2004

(30) Foreign Application Priority Data
Mar. 28, 2003 (DE) ................. 103 14 327

(51) Int. Cl.
F16H 41/04 (2006.01)
(52) U.S. Cl. .................................... 477/107
(58) Field of Classification Search ............... 477/107, 477/111; 192/3–63
See application file for complete search history.

(56) References Cited

U.S. PATENT DOCUMENTS

| 4,077,502 A | * | 3/1978 | Nitsche et al. ............. 192/3.23 |
| 4,419,909 A | | 12/1983 | Opperud et al. ............... 74/856 |
| 6,318,530 B1 | * | 11/2001 | Asada ....................... 192/3.58 |

FOREIGN PATENT DOCUMENTS

| DE | 25 18 186 | 10/1976 |
| DE | 30 23 278 C2 | 1/1993 |

* cited by examiner

Primary Examiner—Dirk Wright
(74) Attorney, Agent, or Firm—Davis & Bujold, P.L.L.C.

(57) ABSTRACT

A clutch (2) is arranged between the drive engine (1) and the hydrodynamic torque converter (4), which is actuated partially in the opening direction during the reversing process to influence the reversing time in a working machine, such as a wheel loader or a floor-level conveyor vehicle.

10 Claims, 1 Drawing Sheet

METHOD FOR THE CONTROL OF A DRIVE TRAIN

This application claims priority from German Application Serial No. 103 14 327.0 filed Mar. 28, 2003.

FIELD OF THE INVENTION

The invention relates to a method for controlling a drive train.

BACKGROUND OF THE INVENTION

The invention relates to working vehicles such as wheel loaders, baggers or floor-level conveyor vehicles, whose driving direction during work changes at short time intervals and which frequently have to be driven backward.

This frequent driving direction change is also known as reversing. In this, the vehicle moving at full driving speed in a forward driving direction is braked by engaging the reverse gear and then accelerated in a backward driving direction.

The vehicle's change of driving direction begins with the opening of the driving direction clutch of the existing driving direction and the closing of the driving direction clutch of the new driving direction. During this change, the turbine side of the hydrodynamic torque converter is slowed down or made to reverse its rotation direction, depending on the force transfer of the forward or backward driving clutch. During this, the pump side of the hydrodynamic torque converter is supported by the drive engine. The deceleration and acceleration times of the vehicle can be influenced by the power of the drive engine, the characteristics of the hydrodynamic torque converter and the slippage time of the driving direction clutches. However, this is only possible in limited measure, since the extent to which the driving direction clutches can be loaded is limited.

DE 30 23 278 C2 discloses a method for the control of a force transfer mechanism, in which the deceleration time is influenced by changing the transmission ratio of the speed-shift transmission when changing the driving direction. It is not possible to change between the driving direction clutches at a high speed.

The purpose of the present invention is to provide a method for controlling a drive train in which frequent driving direction changes, even from high driving speeds are possible and the deceleration and acceleration times can be influenced according to need.

SUMMARY OF THE INVENTION

A clutch connects the drive engine to the pump of the hydrodynamic torque converter according to the invention. During a driving direction change, this clutch is actuated in the opening direction in a controlled way, so that clutch slip occurs.

Depending on the control of the clutch, the deceleration or acceleration time can be influenced. Preferably, the speed of the drive engine is not reduced during the direction change. In a controlled way, it is possible to carry out a hard reversing process, i.e., one with a short reversing time or a soft reversing process, i.e., one with a longer reversing time and to regulate the clutch accordingly. It is also possible to determine the actual deceleration as a function of a predetermined deceleration gradient which can be done, for example, by means of a rotation speed sensor on the drive output of the turnover gear and to regulate the clutch so that the deceleration or acceleration gradient determined approximates the preselected value. Likewise, the clutch can be controlled in such a way that specified operating parameters of the hydrodynamic converter or the driving direction clutches, such as the oil temperature or calculated friction performances, are not exceeded in order to protect the hydrodynamic converter or the driving direction clutches from damage.

This provides a method for the control of a drive train, and a drive train in which frequent reversing is possible with various deceleration and acceleration values, in particular, for working machines. The speed of the drive engine can remain high during the reversing process, so that when accelerating the vehicle in the new driving direction the drive engine can be quickly operated at full power without first having to be slowly accelerated to high speeds. In this way, the acceleration process can be made considerably shorter. It is also possible to carry out a soft reverse over a longer time without damaging the components of the drive train and so to reverse gently, for example, in the case of a wheel loader carrying very light bulky material or a floor-level conveyor vehicle, in particular one with a raised load. In addition, independent of the speed of the drive engine, it is also possible to carry out the reversing process in such a manner as, for example, to make maximum power available during the reversing process to the working hydraulic system which is directly connected to the drive engine. This is made possible by reducing the load on the driving direction clutches as a result of clutch slip between the drive engine and the hydrodynamic torque converter. Consequently, the driving direction clutches can also be made much more compact. In another embodiment, it is possible to influence the deceleration and acceleration time by acting upon the clutch between the drive engine and the hydrodynamic torque converter.

BRIEF DESCRIPTION OF THE DRAWING

The invention will now be described, by way of example, with reference to the accompanying drawings in which.

DETAILED DESCRIPTION OF THE INVENTION

Figure 1:
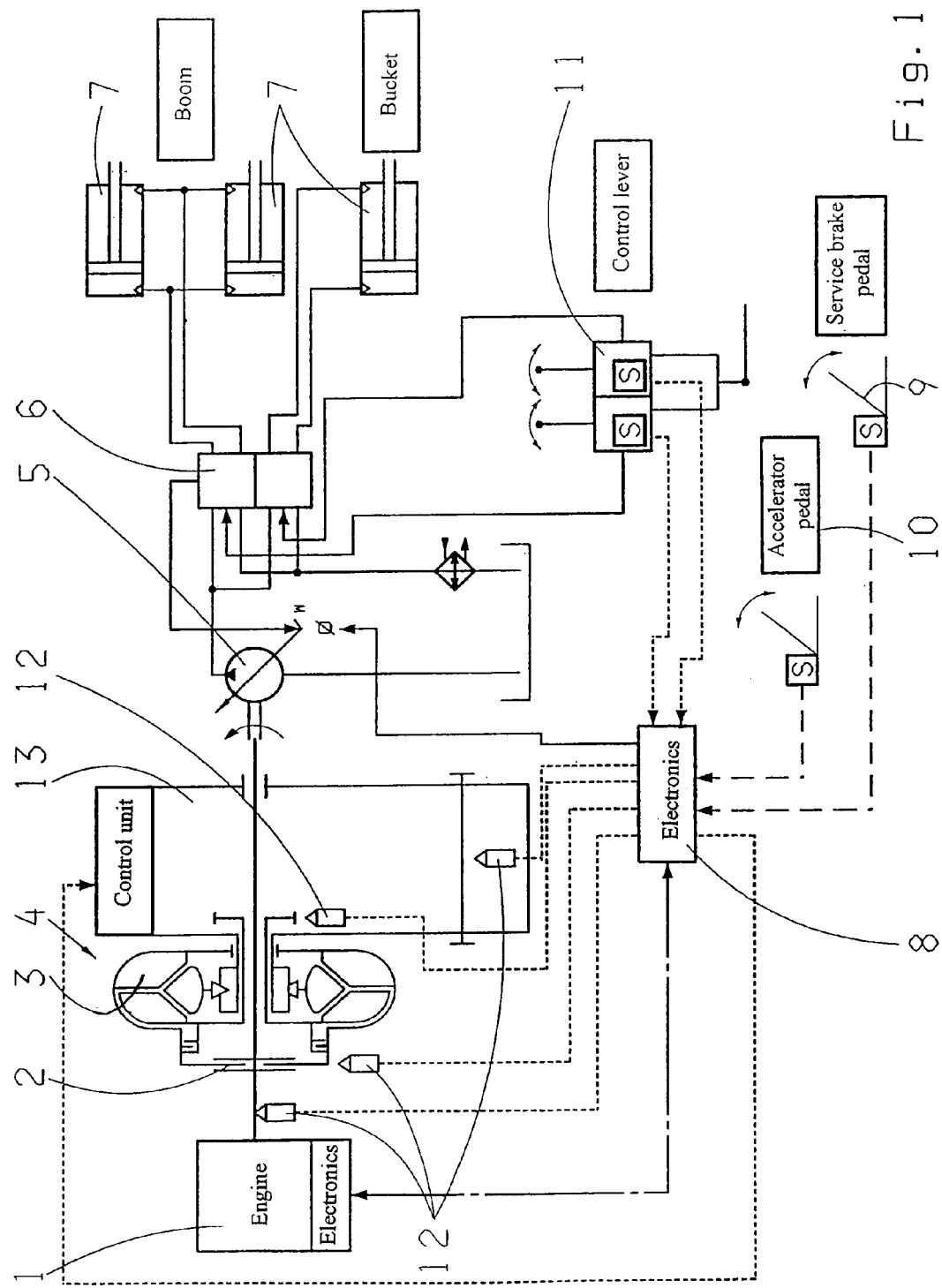
FIG. 1 shows a diagrammatic view of a drive engine.

The single FIGURE shows a drive engine 1, which is connected to a pump 3 of a hydrodynamic torque converter 4 via a clutch 2. The drive engine 1 is directly connected to a hydraulic pump 5, which supplies a consumer 7 with pressure fluid via valves 6. An electronic control unit 8 regulates the clutch 2 as a function of signals from sensors in a service brake 9, an accelerator pedal 10, an operating lever 11 and speed sensors 12. The drive output of the hydrodynamic torque converter 4 is connected to a reversing transmission 13, preferably a change-under-load reversing transmission 13 with several gear steps, which is in connection with the drive wheels of the mobile vehicle. During the reversing process, the driving direction clutches (not shown) in the reversing transmission 13 are manipulated in such a manner that the driving direction clutch for the new driving direction is actuated in the closing direction and the driving direction clutch for the old driving direction is actuated in the opening direction. At the same time, the electronic control unit 8 regulates the clutch 2 so that, depending on the desired deceleration or acceleration values, the vehicle is braked in the existing driving direction and accelerated in the new driving direction. During this reversing process, it is possible not to reduce the speed of the drive engine 1, so that the hydraulic pump 5 can continue being driven with a sufficiently high speed. Likewise, the reversing time can be varied as a function of the regulation of the clutch 2, so as to carry out a soft or a hard reversing process.

REFERENCE NUMERALS

1 Drive engine
2 Clutch
3 Pump
4 Hydrodynamic torque converter
5 Hydraulic pump
6 Valve
7 Consumer
8 Electronic control unit
9 Service brake
10 Accelerator pedal
11 Operating lever
12 Speed sensors
13 Reversing transmission

What is claimed is:

1. A method of controlling a drive train having a drive engine (1) which, via a hydrodynamic torque converter (4), drives a reversing transmission (13) for powering a propulsion drive in a forward first driving direction and in a reverse second driving direction, the method comprising the steps of:
   when initiating a change in driving direction of the propulsion drive, actuating a first driving direction clutch in an engaging direction and actuating a second driving direction clutch in a disengaging direction;
   at least partially actuating a clutch (2), that connects the hydrodynamic torque converter (4) to the drive engine (1), in a disengaging direction during the change in the driving direction; and
   maintaining the speed of the drive engine (1) during the change in the driving direction.

2. The method for the control of a drive train according to claim 1 further comprising the step of regulating or controlling actuation of the clutch (2), that connects the hydrodynamic torque converter (4) to the drive engine (1), so vary a time taken during the change in driving direction.

3. The method for the control of a drive train according to claim 1 further comprising the step of regulating the clutch (2), that connects the hydrodynamic torque converter (4) to the drive engine (1), so that at least one of the first and second driving direction clutches or the hydrodynamic torque converter (4) is operated within acceptable operating parameters.

4. A method for the control of a drive train having a drive engine (1) which, via a hydrodynamic torque converter (4), drives a reversing transmission (13) for powering a propulsion drive in a forward first driving direction and in a reverse second driving direction, the method comprising the steps of:
   when initiating a change in driving direction of the propulsion drive, actuating a first driving direction clutch in an engaging direction and actuating a second driving direction clutch in a disengaging direction;
   at least partially actuating a clutch (2), that connects the hydrodynamic torque converter (4) to the drive engine (1), in a disengaging direction during the change in the driving direction; and
   comparing a determined deceleration gradient or an acceleration gradient with a preselected deceleration gradient or an acceleration gradient, and regulating the clutch (2), that connects the hydrodynamic torque converter (4) to the drive engine (1), in such a manner that a determined value gradient approximates a preselected value gradient.

5. The method for the control of a drive train according to claim 4 further comprising the step of regulating or controlling actuation of the clutch (2), that connects the hydrodynamic torque converter (4) to the drive engine (1), to vary a time taken to change the driving direction.

6. The method for the control of a drive train according to claim 4 further comprising the step of regulating the clutch (2) that connects the hydrodynamic torque converter (4) to the drive engine (1), so that at least one of the first and second driving direction clutches or the hydrodynamic torque converter (4) is operated within acceptable operating parameters.

7. A drive train comprising a drive engine (1) which, via a hydrodynamic torque converter (4), drives a reversing transmission (13) for powering a propulsion drive in a first driving direction for moving in a forward direction and another driving direction for moving in a reverse direction, such that when the driving direction is changed, a first driving direction clutch is actuated in an engaging direction and a second driving direction clutch is actuated in a disengaging direction,
   wherein a clutch (2), that connects the hydrodynamic torque converter (4) to the drive engine (1), is at least partially actuated in the disengaging direction during a change in the driving direction, and the speed of the drive engine (1) is maintained during the change in the driving direction.

8. The drive train according to claim 7, wherein a time taken to change the driving direction is varied by regulating or controlling actuation of the clutch (2) that connects the hydrodynamic torque converter (4) to the drive engine (1).

9. The drive train according to claim 7, wherein a determined deceleration gradient or acceleration gradient is compared with a preselected deceleration gradient or acceleration gradient, and the clutch (2), that connects the hydrodynamic torque converter (4) to the drive engine (1), is regulated such that a determined value gradient approximates a preselected value gradient.

10. The drive train according to claim 7, wherein the clutch (2), that connects the hydrodynamic torque converter (4) to the drive engine (1), is regulated so that the driving direction clutch or the hydrodynamic torque convener (4) is operated within acceptable operating parameters.

* * * * *